(12) United States Patent
Bae et al.

(10) Patent No.: US 8,831,123 B2
(45) Date of Patent: Sep. 9, 2014

(54) APPARATUS AND METHOD FOR SOFT DEMAPPING

(75) Inventors: Ki Taek Bae, Hwaseong-si (KR); Kyeong Yeon Kim, Hwaseong-si (KR); Ho Yang, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 13/483,113

(22) Filed: May 30, 2012

(65) Prior Publication Data

US 2012/0307942 A1    Dec. 6, 2012

(30) Foreign Application Priority Data

May 30, 2011    (KR) .................. 10-2011-0051437

(51) Int. Cl.
| | |
|---|---|
| H04L 27/06 | (2006.01) |
| H03M 13/45 | (2006.01) |
| H04L 27/38 | (2006.01) |
| H04L 25/06 | (2006.01) |
| H04L 27/02 | (2006.01) |

(52) U.S. Cl.
CPC .............. *H04L 27/38* (2013.01); *H04L 25/067* (2013.01)
USPC ........... 375/262; 375/261; 375/260; 375/259; 375/341; 375/340; 375/316; 714/780; 714/752; 714/746; 714/759

(58) Field of Classification Search
USPC ......... 375/340, 341, 267, 261, 262, 260, 259, 375/316; 714/755, 752, 780, 746, 759
See application file for complete search history.

(56) References Cited

U.S. PATENT DOCUMENTS

| | | | |
|---|---|---|---|
| 2004/0264590 | A1 | 12/2004 | Kenney et al. |
| 2006/0274845 | A1 | 12/2006 | Chiang et al. |
| 2007/0058756 | A1 | 3/2007 | Mahadevappa et al. |
| 2008/0175339 | A1 | 7/2008 | Ktenas et al. |
| 2008/0232510 | A1* | 9/2008 | Golitschek Edler Von Elbwart et al. ............................ 375/298 |
| 2012/0140612 | A1* | 6/2012 | Petrov et al. .................. 370/207 |

FOREIGN PATENT DOCUMENTS

| | | |
|---|---|---|
| JP | 2007-081862 A | 3/2007 |
| JP | 2009-033315 A | 2/2009 |
| KR | 10-2005-0061142 A | 6/2005 |
| KR | 10-2008-0052185 A | 6/2008 |
| KR | 10-2009-0122441 A | 11/2009 |

OTHER PUBLICATIONS

Meng Li; Nour, C.A.; Jego, C.; Jianxiao Yang; Douillard, C., "Efficient iterative receiver for bit-Interleaved Coded Modulation according to the DVB-T2 standard," Acoustics, Speech and Signal Processing (ICASSP), 2011 IEEE International Conference on , vol., No., pp. 3168,3171, May 22-27, 2011.*

(Continued)

*Primary Examiner* — Chieh M Fan
*Assistant Examiner* — Michelle M Koeth
(74) *Attorney, Agent, or Firm* — NSIP Law

(57) ABSTRACT

Provided is a soft demapping apparatus that may detect a log likelihood ratio (LLR) value of a quadrature amplitude modulation (QAM) signal, using a shifted table scheme, may designate a sub-region of the QAM signal corresponding to bit information that is obtained by decoding the LLR value, and may calculate an LLR value of other bit information included in the designated sub-region.

16 Claims, 7 Drawing Sheets

(56) References Cited

OTHER PUBLICATIONS

Meng Li; Nour, C.A.; Jego, C.; Douillard, C., "Design of rotated QAM mapper/demapper for the DVB-T2 standard," Signal Processing Systems, 2009. SiPS 2009. IEEE Workshop on , vol., No., pp. 018,023, Oct. 7-9, 2009.*

Meng Li; Nour, C.A.; Jego, C.; Jianxiao Yang; Douillard, C., "Efficient iterative receiver for bit-Interleaved Coded Modulation according to the DVB-T2 standard," Acoustics, Speech and Signal Processing (ICASSP), 2011 IEEE International Conference on, vol., No., pp. 3168,3171, May 22-27, 2011.*

Kitaek Bae; Kyeongyeon Kim; Ho Yang, "Low complexity two-stage soft demapper for rotated constellation in DVB-T2," Consumer Electronics (ICCE), 2012 IEEE International Conference on , vol., No., pp. 618,619, Jan. 13-16, 2012.*

Min Li; Bourdoux, A.; Dejonghe, A.; Van Der Perre, L., "A Geometrical Approach for Highly Efficient Soft Demodulation of Rotated Constellations," Signal Processing Systems (SiPS), 2012 IEEE Workshop on , vol., No., pp. 179,184, Oct. 17-19, 2012.*

Gomes, M.; Cercas, F.; Silva, V.; Tomlinson, M., "Efficient M-QAM Transmission Using Compacted Magnitude Modulation Tables," Global Telecommunications Conference, 2008. IEEE GLOBECOM 2008. IEEE , vol., No., pp. 1,5, Nov. 30, 2008-Dec. 4, 2008.*

Kyeongyeon Kim; Kitaek Bae; Ho Yang, "One-dimensional soft-demapping using decorrelation with interference cancellation for rotated QAM constellations," Consumer Communications and Networking Conference (CCNC), 2012 IEEE , vol., No., pp. 787,791, Jan. 14-17, 2012.*

Kyeongyeon Kim; Basutkar, N.; Kitaek Bae; Peng Xue; Ho Yang, "One-Dimensional Soft-Demapping Algorithms for Rotated QAM and Software Implementation on DSP," Signal Processing, IEEE Transactions on , vol. 61, No. 15, pp. 3918,3930, Aug. 1, 2013.*

Boutros, J.; Viterbo, E., "Signal space diversity: a power- and bandwidth-efficient diversity technique for the Rayleigh fading channel," Information Theory, IEEE Transactions on , vol. 44, No. 4, pp. 1453,1467, Jul. 1998.*

Pérez-Calderón, D.; Baena-Lecuyer, V.; Oria, A.C.; López, P.; Doblado, J.G., "Rotated constellation demapper for DVB-T2," Electronics Letters , vol. 47, No. 1, pp. 31,32, Jan. 6, 2011.*

\* cited by examiner

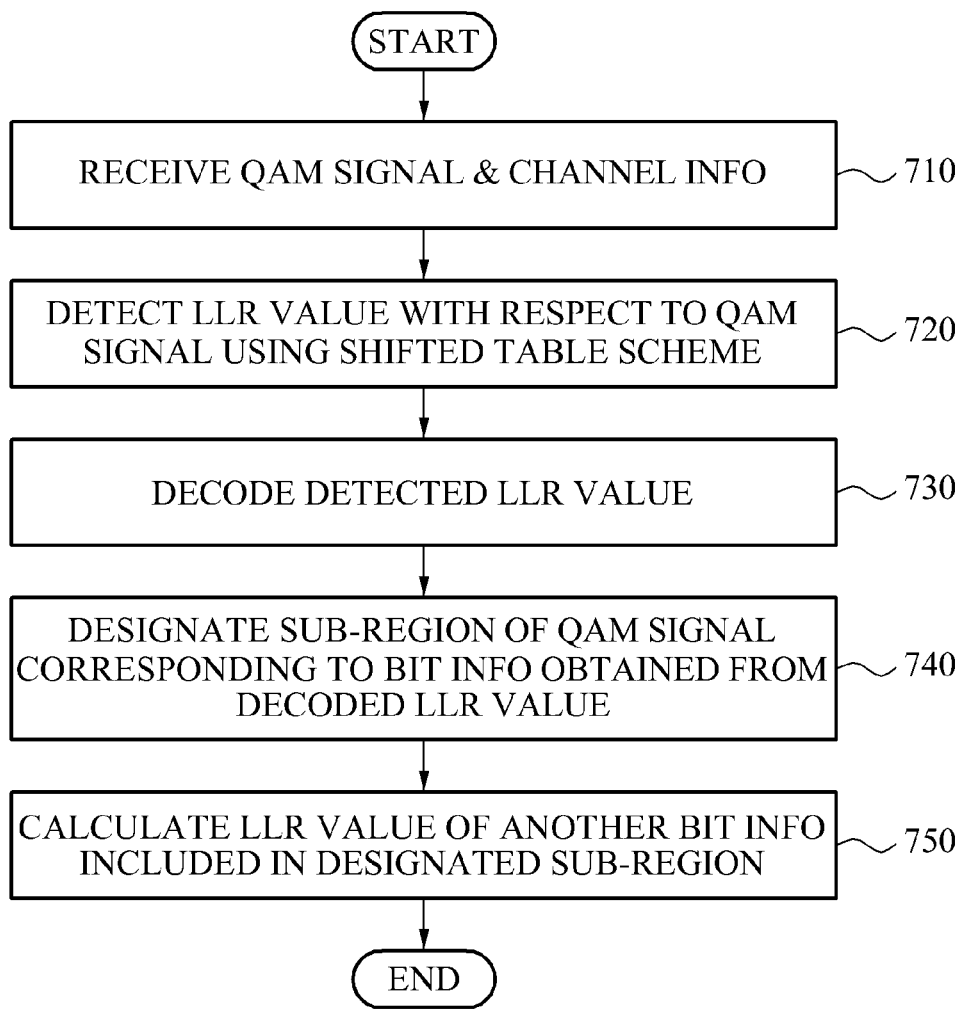

APPARATUS AND METHOD FOR SOFT DEMAPPING

CROSS-REFERENCE TO RELATED APPLICATION(S)

This application claims the benefit under 35 USC §119(a) of Korean Patent Application No. 10-2011-0051437, filed on May 30, 2011, in the Korean Intellectual Property Office, the entire disclosure of which is incorporated herein by reference for all purposes.

BACKGROUND

1. Field

The following description relates to an apparatus and method for soft demapping that may calculate a log likelihood ratio (LLR) value with respect to a quadrature amplitude modulation (QAM) signal.

2. Description of Related Art

In an effort to enhance the performance of a broadcasting communication system, a signal space diversity (SSD) method of a rotated constellation form may be applied to digital video broadcasting-second generation terrestrial (DVB-T2).

When calculating a log likelihood ratio (LLR) value using a diversity gain of a received signal, quadrature amplitude modulation (QAM) performance may increase in a fading channel. However, because a constellation may rotate along an in-phase (I)-quadrature (Q) plane, it is difficult to secure the independency of an I channel and/or a Q channel. That is, by simply applying existing one-dimensional (1D) max-log LLR demapping, a diversity gain may be lost.

As another example, by applying two-dimensional (2D) LLR demapping simultaneously using a value of the in-phase (I) channel and a value of the quadrature (Q) channel to an M-QAM signal, an amount of calculations may increase by a few times or more in comparison to an existing amount of calculations.

Accordingly, there is a desire for an algorithm that may enhance the performance of the full search 2D LLR calculation with a smaller amount of calculations.

SUMMARY

In one general aspect, there is provided an apparatus for soft demapping, the apparatus including a detector configured to detect a log likelihood ratio (LLR) value with respect to a quadrature amplitude modulation (QAM) signal using a shifted table scheme, a decoder configured to decode the detected LLR value, a region selector configured to designate a sub-region of the QAM signal corresponding to bit information that is obtained to from the decoded LLR value, and a calculator configured to calculate an LLR value of other bit information that is included in the designated sub-region.

The apparatus may further comprise a receiver configured to receive the QAM signal and channel information via each of two channels.

The detector may be configured to detect the LLR value with respect to the QAM signal using one dimension (1D).

The calculator may be configured to calculate the LLR value of the other bit information using two dimensions (2D).

The region selector may be configured to determine the sub-region based on an adaptive candidate decision scheme.

The calculator may be configured to calculate the LLR value of the other bit information included in the sub-region using two dimensions.

In response to channel information of the two channels being the same as each other, the detector may be configured to detect the LLR value by rotating the QAM signal by a predetermined rotation angle.

In response to channel information of the two channels being different from each other, the detector may be configured to detect an LLR value of a channel having a relatively high channel gain between the two channels.

In response to at least one of the two channels corresponding to an erasure channel, the detector may be configured to set a shift step that is shifted by the shifted table scheme to zero, and to detect the LLR value using a reference LLR table.

The sub-region selector may be configured to quantize the sub-region to a two-dimensional table based on a predetermined LLR value.

In another aspect, there is provided a method for soft demapping, the method including detecting a log likelihood ratio (LLR) value with respect to a quadrature amplitude modulation (QAM) signal using a shifted table scheme, decoding the detected LLR value, designating a sub-region of the QAM signal corresponding to bit information that is obtained from the decoded LLR value, and calculating an LLR value of other bit information that is included in the designated sub-region.

The method may further comprise receiving the QAM signal and channel information via each of two channels.

The calculating may comprise calculating the LLR value of the other bit information using two dimensions (2D).

The designating may comprise determining the sub-region using an adaptive candidate decision scheme.

The detecting may comprise detecting the LLR value by rotating the QAM signal by a predetermined rotation angle, in response to channel information of the two channels being the same as each other.

The detecting may comprise detecting an LLR value of a channel having a relatively high channel gain between the two channels, in response to channel information of the two channels being different from each other.

The detecting may comprise setting a shift step that is shifted by the shifted table scheme to zero, and detecting the LLR value using a reference LLR table, in response to at least one of the two channels corresponding to an erasure channel.

In another aspect, there is provided a non-transitory computer-readable storage medium having stored therein program instructions to cause a computer to execute a method including detecting a log likelihood ratio (LLR) value with respect to a quadrature amplitude modulation (QAM) signal using a shifted table scheme, decoding the detected LLR value, designating a sub-region of the QAM signal corresponding to bit information that is obtained from the decoded LLR value, and calculating an LLR value of other bit information that is included in the designated sub-region.

Other features and aspects will be apparent from the following detailed description, the drawings, and the claims.

BRIEF DESCRIPTION OF THE DRAWINGS

FIG. 7 is a flowchart illustrating an example of a method for soft demapping.

Figure 1:
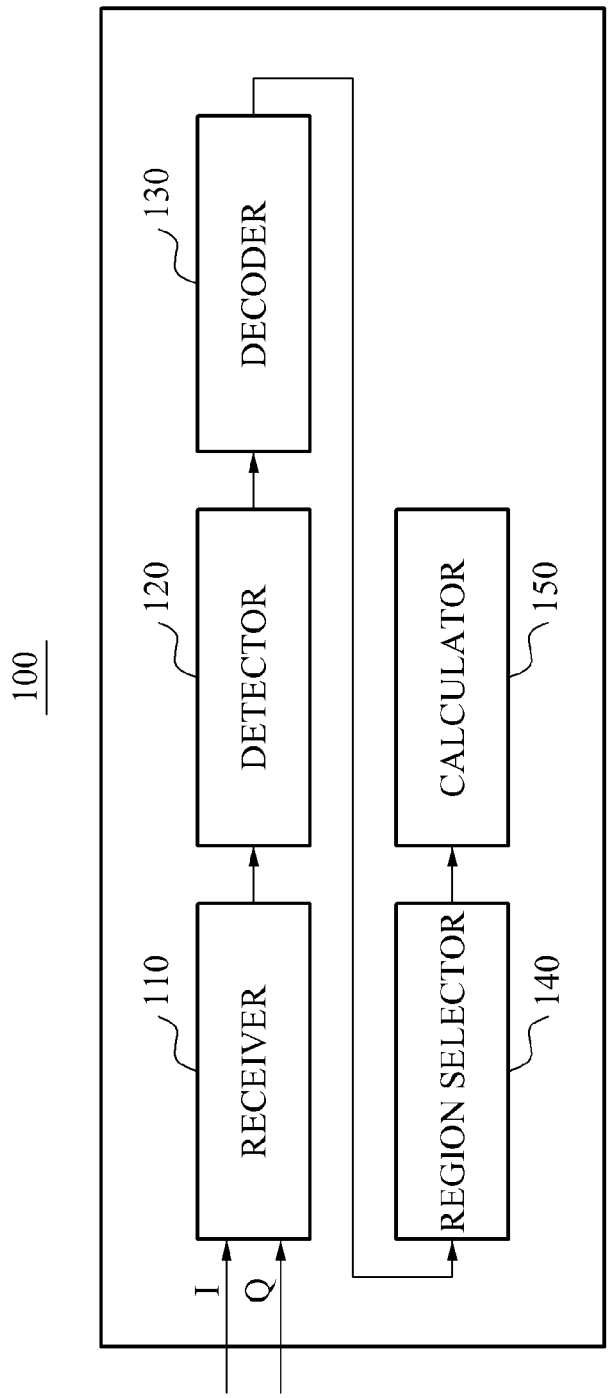
FIG. 1 is a diagram illustrating an example of a soft demapping apparatus.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, description of well-known functions and constructions may be omitted for increased clarity and conciseness.

Various examples are directed towards a soft demapping apparatus that may employ a shifted table to calculate a log likelihood ratio (LLR) value with respect to a rotated constellation quadrature amplitude modulation (QAM) signal. The soft demapping apparatus may designate a sub-region, and may calculate an LLR value corresponding to another bit information using two dimensions (2D).

FIG. 1 illustrates an example of a soft demapping apparatus 100. The soft demapping apparatus 100 may be or may be included in a terminal, for example, a mobile phone, a smart phone, a computer, a tablet, and the like.

Referring to FIG. 1, the soft demapping apparatus 100 includes a receiver 110 to receive a QAM signal and channel information. For example, the receiver may receive the QAM signal and the channel information via each of two channels. The soft demapping apparatus 100 also includes a detector 120 to detect an LLR value with respect to a QAM signal using a shifted table scheme, a decoder 130 to decode the detected LLR value, a region selector 140 to designate a sub-region of a QAM signal corresponding to bit information that is obtained from the decoded LLR value, and a calculator 150 to calculate an LLR value of other bit information that is included in the designated sub-region.

As an example, the detector 120 may detect the LLR value with respect to the QAM signal using one dimension (1D). For example, the detector 120 may compare a value of an in-phase (I) channel and a value of a quadrature (Q) channel and detect in one dimension the LLR value with respect to a QAM signal corresponding to a superior channel based on a result of the comparison. The calculator may calculate the LLR value of the other bit information that is included in the designated sub-region corresponding to another inferior channel. In this example, the calculator may perform the calculation of the LLR value of the other bit information in two dimensions.

Figure 2:
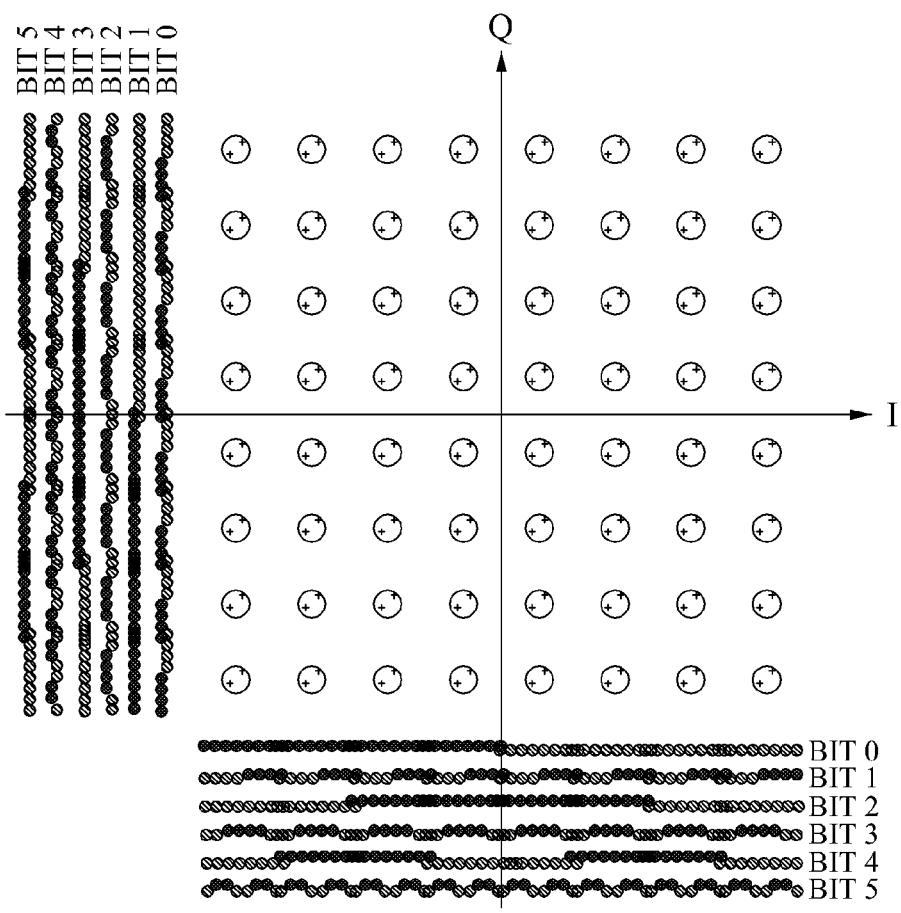
FIG. 2 is a diagram illustrating an example of a de-rotated quadrature amplitude modulation (QAM) signal.
Figure 3:
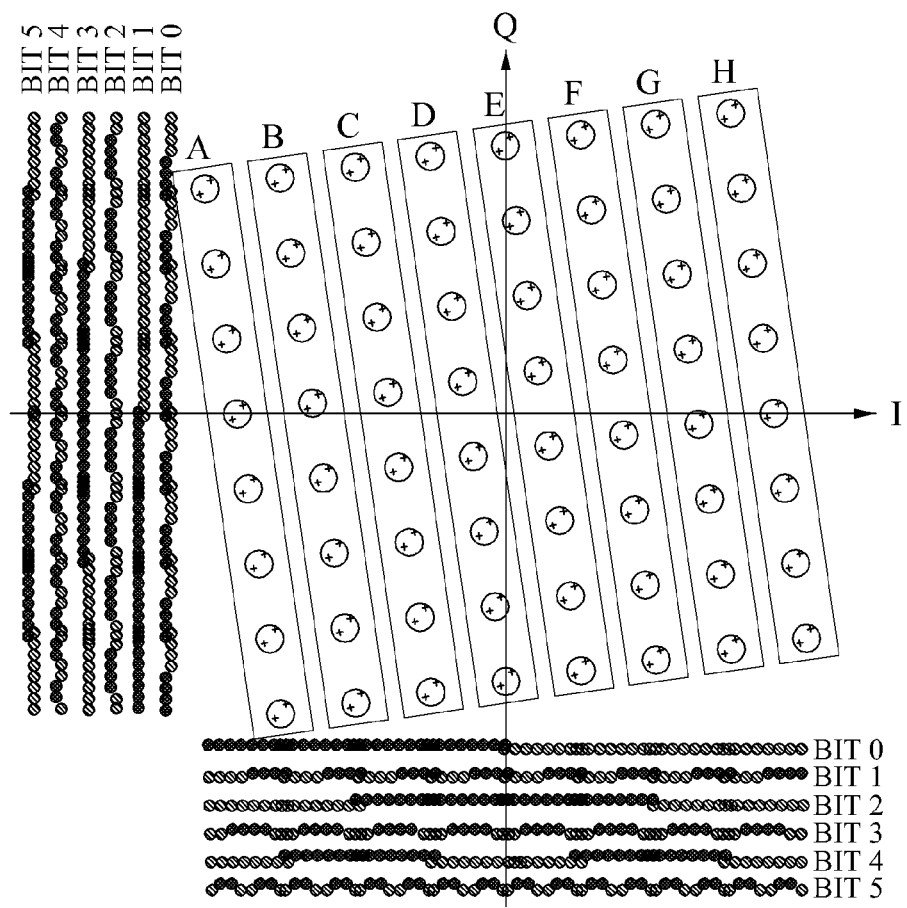
FIG. 3 is a diagram illustrating an example of a QAM signal that is received from an equalized in-phase (I) channel and a quadrature (Q) channel.

FIG. 2 illustrates an example of a de-rotated QAM signal, and FIG. 3 illustrates an example of a QAM signal received from an equalized in-phase (I) channel and a quadrature (Q) channel.

Referring to FIG. 2 and FIG. 3, the received QAM signal may be a signal received from the equalized I channel and Q channel, and channel information may be given as CSI_I and CSI_Q.

In various examples, if the soft demapping apparatus 100 is applied to digital video broadcasting-second generation terrestrial (DVB-T2), a rotation angle according to a modulation order may be defined as shown in Table 1.

TABLE 1

| Modulation | Rotation Angle (Φ) [degrees] |
|---|---|
| QPSK | 29.0 |
| 16-QAM | 16.8 |
| 64-QAM | 8.6 |
| 256-QAM | atan (1/16) |

As shown in FIG. 3, a signal space diversity (SSD) may be obtained by performing constellation rotation of the QAM signal. The soft demapping apparatus 100 may obtain the SSD using the defined rotation angle. For example, in the case of a reference rotated 64-QAM constellation, the soft demapping apparatus 100 may obtain the SSD as shown in the example of FIG. 3.

Referring again to FIG. 1, the region selector 140 may determine the sub-region, for example, using an adaptive candidate decision scheme, and the like. The calculator 150 may calculate the LLR value of the other bit information included in the sub-region that is determined, for example, using the adaptive candidate decision scheme. In this example, the calculator may perform the calculation of the LLR value of the other bit information in two dimensions.

As shown in FIG. 3, LLR values of bits corresponding to an axis of an inferior channel may be calculated by decoding LLR values of bits corresponding to an axis of a superior channel. For example, the selector 140 may select one sub-region from eight sub-regions A, B, C, D, E, F, G, and H, and the calculator 150 may calculate LLR values of the other bits included in the selected sub-region.

The detector 120 may detect the LLR value by rotating the QAM signal by a predetermined rotation angle. For example, if channel information of the two channels is identical to each other, the detector 120 may detect the LLR value by rotating the QAM signal by a predetermined rotation angle.

Figure 4:
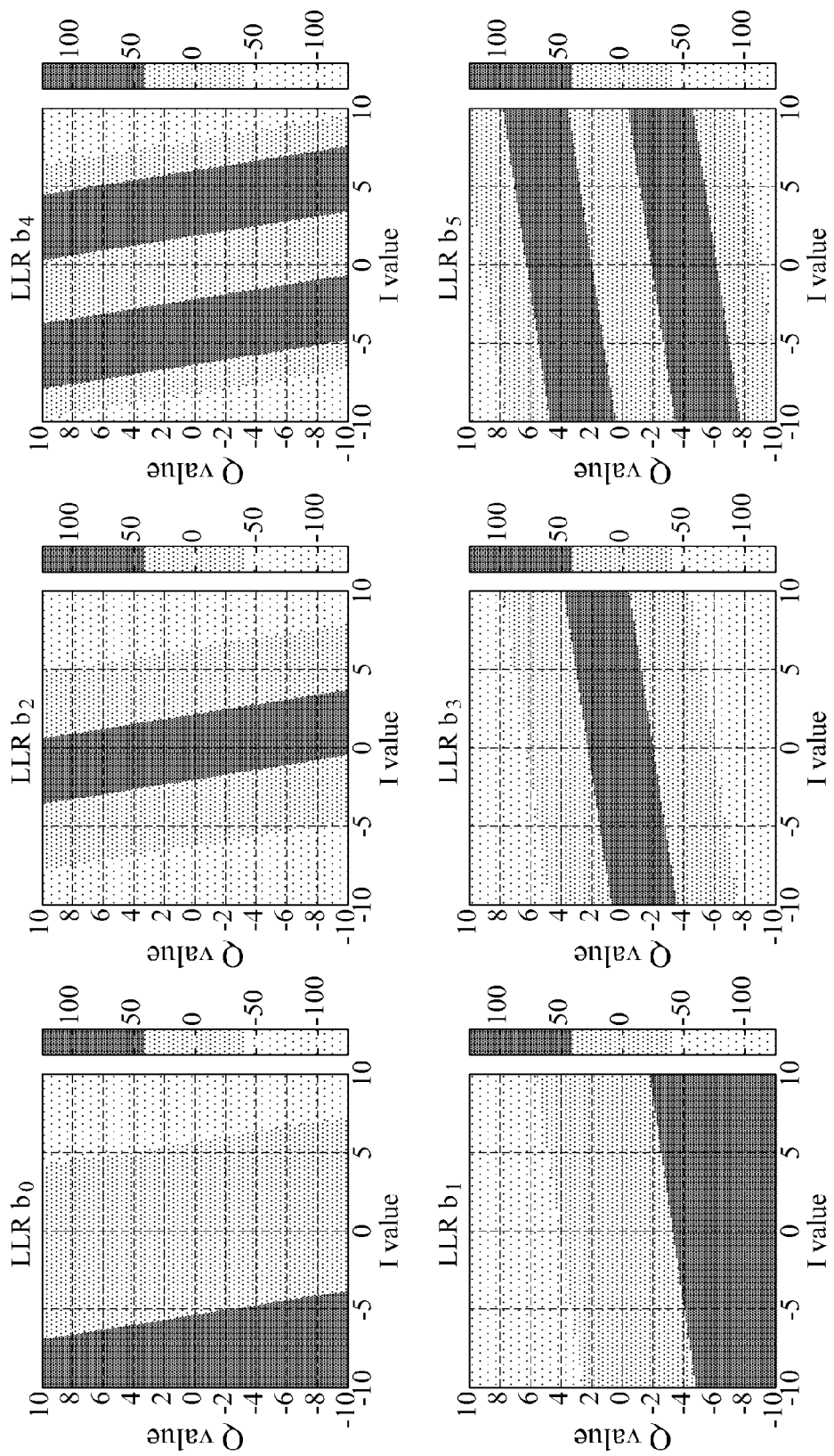
FIG. 4 is a diagram illustrating an example of a contour line of a distribution of log likelihood ratio (LLR) values when channel information of an I channel and channel information of a Q channel are the same as each other.

FIG. 4 illustrates an example of contour line with respect to the distribution of LLR values when channel information of an I channel and channel information of a Q channel are the same as each other.

For example, if channel information of the I channel and channel information of the Q channel are the same as each other, and if each of I input range and Q input range of a received QAM signal is within −10 to 10 as shown in FIG. 4, a 2D LLR value may be obtained. In this example, a contour line of an LLR value corresponding to each bit may be rotated by a predetermined rotation angle.

A Q value of received QAM signal=0 may be assumed as a reference LLR value, and an LLR value corresponding to an even bit value of the I channel may be shifted from the reference LLR value by an LLR value corresponding to each bit, based on the received Q value.

Figure 5:
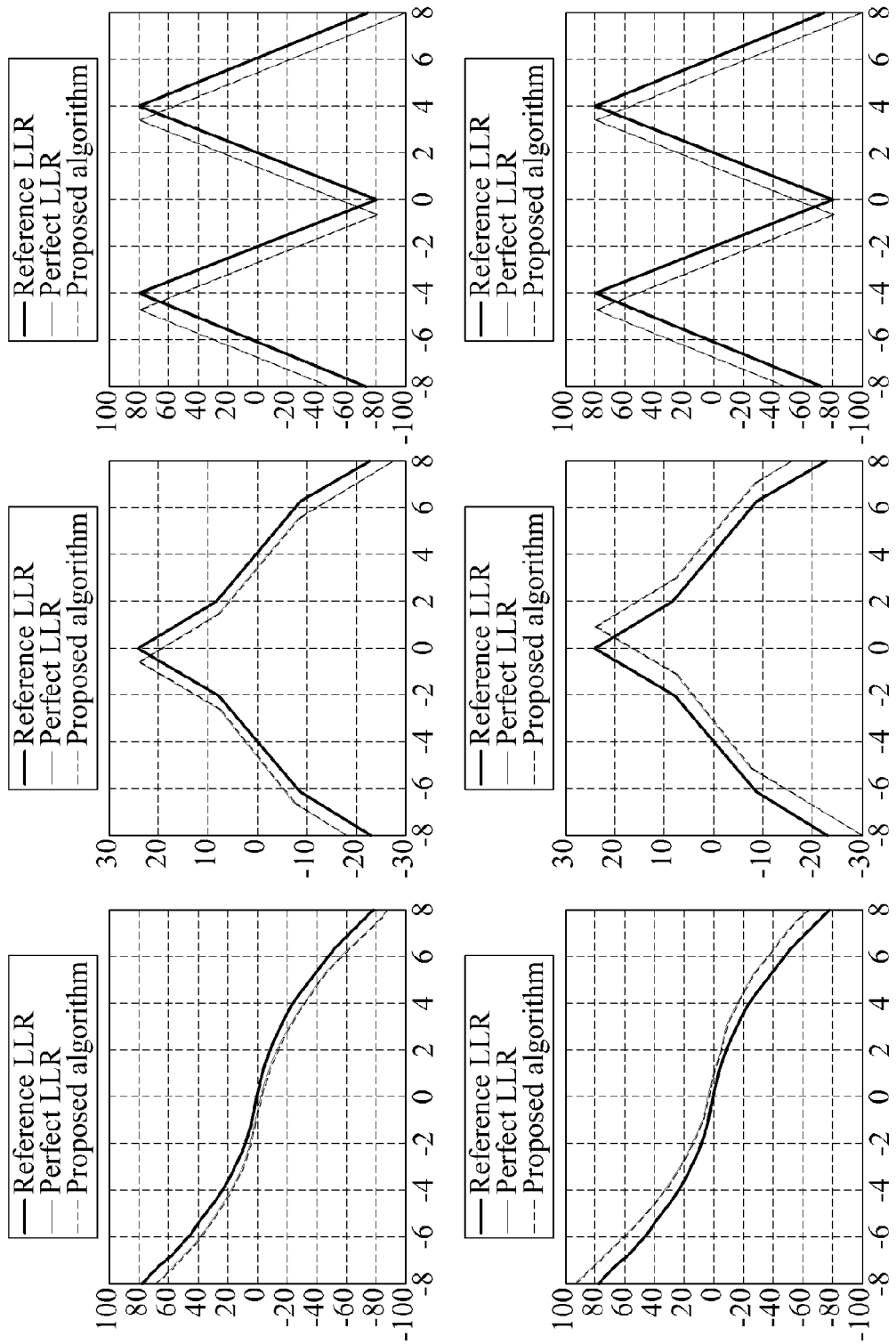
FIG. 5 is diagram illustrating an example of graphs for verifying an LLR value calculation algorithm using a shifted table scheme with respect to a received QAM signal.

FIG. 5 illustrates examples of graphs for verifying an LLR value calculation algorithm using a shifted table scheme with respect to a received QAM signal.

For example, a shifted table applying an LLR value calculation algorithm of the soft demapping apparatus 100 may match a 2D LLR value calculation as shown in FIG. 5. In this example, when channel information of two channels is different from each other, the detector 120 may detect an LLR value of a channel having a relatively high channel gain between two channels.

Figure 6:
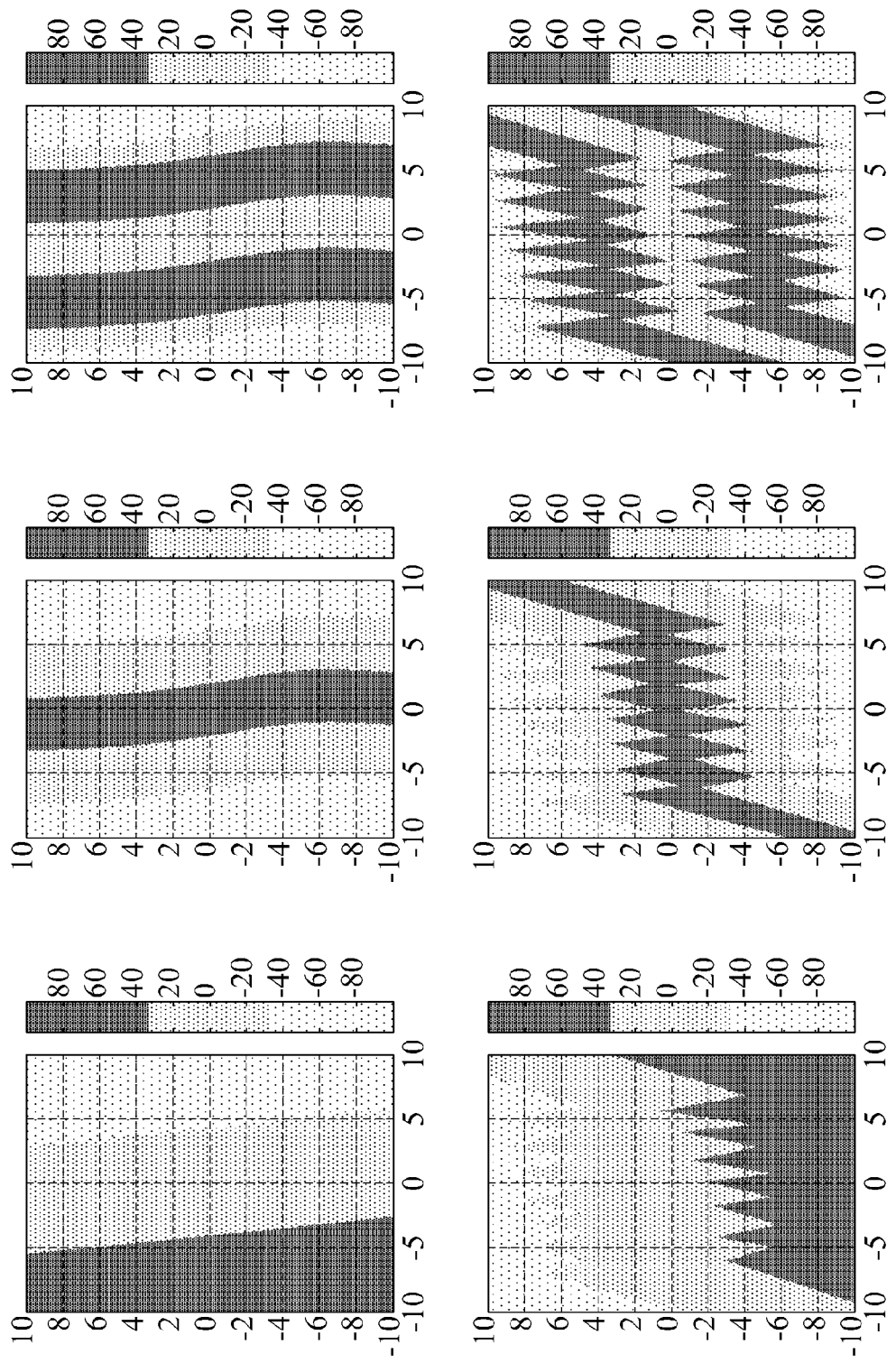
FIG. 6 is a diagram illustrating an example of contour line of a distribution of LLR values when channel information of an I channel and channel information of a Q channel are different from each other.

FIG. 6 illustrates an example of a contour line with respect to the distribution of LLR values when channel information of an I channel and channel information of a Q channel are different from each other.

Referring to FIG. 6, when CSI_I is greater than CSI_Q, an LLR value corresponding, to an even bit included in CSI_I may have the same pattern as a case in which channel information of the I channel and channel information of the Q channel are the same as each other. An LLR value corresponding to an odd bit included in CSI_Q may have a different value based on a channel value.

As described above, because LLR values may be different based on channel information, an LLR value of a bit corresponding to superior channel information may be calculated using a shifted table scheme as shown in FIG. 5.

When at least one of the two channels corresponds to an erasure channel, the detector 120 may set a shift step that is shifted by the shifted table scheme to zero, and may detect the LLR value using a reference LLR table.

The soft demapping apparatus 100 may select a sub-region by decoding an LLR value corresponding to superior channel information. For example, it is possible to obtain 3-bit information. The soft demapping apparatus 100 may designate a position of a column or a row based on channel information and may select a single sub-region from eight sub-regions.

Referring to FIG. 6, 2D LLR values of odd bits corresponding to an axis of inferior channel information may have eight similar patterns based on a column of a rotation constellation. Accordingly, the soft demapping apparatus 100 may perform 2D LLR value calculation within a selected sub-region using the above regularity.

The sub-region selector 140 may quantize the sub-region to a 2D table based on a predetermined LLR value.

FIG. 7 illustrates an example of a method for soft demapping.

Referring to FIG. 7, in 710, the soft demapping apparatus 100 receives a QAM signal and channel information, for example, via each of two channels.

In 720, the soft demapping apparatus 100 detects an LLR value with respect to the QAM signal using a shifted table scheme.

In 730, the soft demapping apparatus 100 decodes the detected LLR value.

In 740, the soft demapping apparatus 100 designates a sub-region of a QAM signal corresponding to bit information that is obtained from the decoded LLR value.

In 750, the soft demapping apparatus 100 calculates an LLR value of another bit information that is included in the designated sub-region.

According to various examples herein, it is possible to compare a value of an I channel and a value of a Q channel, to detect an LLR with respect to bit information of a QAM signal corresponding to a superior channel using one dimension, and to calculate an LLR value of other bit information included in a designated sub-region corresponding to an inferior channel using two dimensions.

According to various examples herein, there is provided an apparatus and method for soft demapping that may achieve the full search 2D LLR performance with a relatively small amount of calculations.

Program instructions to perform a method described herein, or one or more operations thereof, may be recorded, stored, or fixed in one or more computer-readable storage media. The program instructions may be implemented by a computer. For example, the computer may cause a processor to execute the program instructions. The media may include, alone or in combination with the program instructions, data files, data structures, and the like. Examples of computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The program instructions, that is, software, may be distributed over network coupled computer systems so that the software is stored and executed in a distributed fashion. For example, the software and data may be stored by one or more computer readable storage mediums. Also, functional programs, codes, and code segments for accomplishing the example embodiments disclosed herein can be easily construed by programmers skilled in the art to which the embodiments pertain based on and using the flow diagrams and block diagrams of the figures and their corresponding descriptions as provided herein. Also, the described unit to perform an operation or a method may be hardware, software, or some combination of hardware and software. For example, the unit may be a software package running on a computer or the computer on which that software is running.

As a non-exhaustive illustration only, a terminal/device/unit described herein may refer to mobile devices such as a cellular phone, a personal digital assistant (PDA), a digital camera, a portable game console, and an MP3 player, a portable/personal multimedia player (PMP), a handheld e-book, a portable laptop PC, a global positioning system (GPS) navigation, a tablet, a sensor, and devices such as a desktop PC, a high definition television (HDTV), an optical disc player, a setup box, a home appliance, and the like that are capable of wireless communication or network communication consistent with that which is disclosed herein.

A computing system or a computer may include a microprocessor that is electrically connected with a bus, a user interface, and a memory controller. It may further include a flash memory device. The flash memory device may store N-bit data via the memory controller. The N-bit data is processed or will be processed by the microprocessor and N may be 1 or an integer greater than 1. Where the computing system or computer is a mobile apparatus, a battery may be additionally provided to supply operation voltage of the computing system or computer. It will be apparent to those of ordinary skill in the art that the computing system or computer may further include an application chipset, a camera image processor (CIS), a mobile Dynamic Random Access Memory (DRAM), and the like. The memory controller and the flash memory device may constitute a solid state drive/disk (SSD) that uses a non-volatile memory to store data.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An apparatus configured to perform soft demapping, the apparatus comprising:
a detector configured to
detect a log likelihood ratio (LLR) value with respect to a quadrature amplitude modulation (QAM) signal, using a shifted table scheme, and
set a shift step that is shifted by the shifted table scheme to zero to cancel detecting the LLR value using the shifted table scheme, and detect the LLR value using a reference LLR table, in response to at least one of two channels corresponding to an erasure channel;
a decoder configured to decode the detected LLR value;
a region selector configured to designate a sub-region of the QAM signal corresponding to bit information that is obtained from the decoded LLR value; and
a calculator configured to calculate an LLR value of other bit information that is included in the designated sub-region,
wherein the shifted table scheme assumes that a Q value of a received signal equals zero as a reference LLR value, and then shifts from the reference LLR value corresponding to an even bit value of the I channel by an LLR value that corresponds to each bit based on the Q value of the received signal.

2. The apparatus of claim 1, further comprising:
a receiver configured to receive the QAM signal and channel information via each of the two channels.

3. The apparatus of claim 1, wherein the detector is configured to detect the LLR value with respect to the QAM signal, using one dimension (1D).

4. The apparatus of claim 1, wherein the calculator is configured to calculate the LLR value of the other bit information, using two dimensions (2D).

5. The apparatus of claim 1, wherein the region selector is configured to determine the sub-region based on an adaptive candidate decision scheme.

6. The apparatus of claim 5, wherein the calculator is configured to calculate the LLR value of the other bit information that is included in the sub-region, using two dimensions.

7. The apparatus of claim 1, wherein, in response to channel information of the two channels being the same as each other, the detector is configured to detect the LLR value by rotating the QAM signal by a predetermined rotation angle.

8. The apparatus of claim 1, wherein, in response to channel information of the two channels being different from each other, the detector is configured to detect an LLR value of a channel comprising a relatively high channel gain between the two channels.

9. The apparatus of claim 1, wherein the region selector is configured to quantize the sub-region to a two-dimensional table based on a predetermined LLR value.

10. A method of soft demapping, the method comprising:
detecting a log likelihood ratio (LLR) value with respect to a quadrature amplitude modulation (QAM) signal, using a shifted table scheme;
setting a shift step that is shifted by the shifted table scheme to zero to cancel detecting the LLR value using the shifted table scheme, and detecting the LLR value using a reference LLR table, in response to at least one of two channels corresponding to an erasure channel;
decoding the detected LLR value;
designating a sub-region of the QAM signal corresponding to bit information that is obtained from the decoded LLR value; and
calculating an LLR value of other bit information that is included in the designated sub-region,
wherein the shifted table scheme assumes that a Q value of a received signal equals zero as a reference LLR value, and then shifts from the reference LLR value corresponding to an even bit value of the I channel by an LLR value that corresponds to each bit based on the Q value of the received signal.

11. The method of claim 10, further comprising:
receiving the QAM signal and channel information via each of the two channels.

12. The method of claim 10, wherein the calculating comprises calculating the LLR value of the other bit information, using two dimensions (2D).

13. The method of claim 10, wherein the designating comprises determining the sub-region based on an adaptive candidate decision scheme.

14. The method of claim 10, wherein the detecting comprises detecting the LLR value by rotating the QAM signal by a predetermined rotation angle, in response to channel information of the two channels being the same as each other.

15. The method of claim 10, wherein the detecting comprises detecting an LLR value of a channel comprising a relatively high channel gain between the two channels, in response to channel information of the two channels being different from each other.

16. A non-transitory computer-readable storage medium storing a program comprising instructions to cause a computer to execute a method comprising:
detecting a log likelihood ratio (LLR) value with respect to a quadrature amplitude modulation (QAM) signal, using a shifted table scheme;
setting a shift step that is shifted by the shifted table scheme to zero to cancel detecting the LLR value using the shifted table scheme, and detecting the LLR value using a reference LLR table, in response to at least one of two channels corresponding to an erasure channel;
decoding the detected LLR value;
designating a sub-region of the QAM signal corresponding to bit information that is obtained from the decoded LLR value; and
calculating an LLR value of other bit information that is included in the designated sub-region,
wherein the shifted table scheme assumes that a Q value of a received signal equals zero as a reference LLR value, and then shifts from the reference LLR value corresponding to an even bit value of the I channel by an LLR value that corresponds to each bit based on the Q value of the received signal.

* * * * *